United States Patent
Peng et al.

(10) Patent No.: US 11,282,197 B2
(45) Date of Patent: Mar. 22, 2022

(54) SYSTEM FOR ANALYZING BRAIN TISSUE COMPONENTS BASED ON COMPUTED TOMOGRAPHY IMAGE AND OPERATION METHOD THEREOF

(71) Applicants: National Central University, Taoyuan (TW); Huan-Cheng Chang, Taoyuan (TW); Taipei Medical University (TMU), Taipei (TW)

(72) Inventors: Syu-Jyun Peng, Hsinchu County (TW); Yu-Wei Chen, Taoyuan (TW); Jing-Yu Yang, Taipei (TW); Jang-Zern Tsai, Taoyuan (TW); Kuo-Wei Wang, Taoyuan (TW); Yeh-Lin Kuo, Kaohsiung (TW)

(73) Assignees: National Central University, Taoyuan (TW); Huan-Cheng Chang, Taoyuan (TW); Taipei Medical University (TMU), Taipei (TW)

(*) Notice: Subject to any disclaimer, the term of this patent is extended or adjusted under 35 U.S.C. 154(b) by 24 days.

(21) Appl. No.: 16/929,080

(22) Filed: Jul. 14, 2020

(65) Prior Publication Data
US 2021/0256688 A1    Aug. 19, 2021

(30) Foreign Application Priority Data
Feb. 13, 2020 (TW) .................... 109104583

(51) Int. Cl.
*G06T 7/00* (2017.01)
*G06T 5/00* (2006.01)
(Continued)

(52) U.S. Cl.
CPC ............ *G06T 7/0012* (2013.01); *G06T 5/002* (2013.01); *G06T 5/50* (2013.01); *G06T 19/20* (2013.01);
(Continued)

(58) Field of Classification Search
CPC ....... G06T 7/0012; G06T 7/0014; G06T 7/11; G06T 7/0016; G06T 5/002; G06T 5/50;
(Continued)

(56) References Cited

U.S. PATENT DOCUMENTS 9,159,127 B2   10/2015  Meetz et al.
10,242,443 B2*  3/2019  Hsieh ..................... G16H 40/40
(Continued)

FOREIGN PATENT DOCUMENTS

CN   104545980 A   4/2015
CN   106599549 A   4/2017
(Continued)

OTHER PUBLICATIONS

Specification of U.S. Appl. No. 62/890,868, filed Aug. 8, 2019 (Year: 2019).*
(Continued)

*Primary Examiner* — Jose L Couso
(74) *Attorney, Agent, or Firm* — CKC & Partners Co., LLC

(57) ABSTRACT

The present disclosure provides an operating method of a system for analyzing brain tissue based on computerized tomographic imaging, and the operation method includes steps as follows. A computed tomography image of a subject is aligned to a predetermined standard brain space image, to obtain a first normalized test computed tomography image. A voxel contrast of the first normalized test computed tomography image is enhanced to obtain an enhanced first normalized test computed tomography image. The enhanced first normalized test computed tomography image is aligned to an average computed tomographic image of a control group to obtain a second normalized test computed tomography image. An analysis based on the second normalized test computed tomography image and a plurality of com-
(Continued)

puterized tomographic images of the control group is performed to obtain a t-score map.

8 Claims, 5 Drawing Sheets

(51) Int. Cl.
*G06T 5/50* (2006.01)
*G06T 19/20* (2011.01)

(52) U.S. Cl.
CPC ........... *G06T 2207/10081* (2013.01); *G06T 2207/20021* (2013.01); *G06T 2207/20081* (2013.01); *G06T 2207/20084* (2013.01); *G06T 2207/20216* (2013.01); *G06T 2207/30016* (2013.01); *G06T 2210/41* (2013.01); *G06T 2219/2004* (2013.01)

(58) Field of Classification Search
CPC ............ G06T 19/20; G06T 15/08; G06T 2207/10081; G06T 2207/20081; G06T 2207/20084; G06T 2207/20216; G06T 2207/20021; G06T 2207/30016; G06T 2207/30004; G06T 2207/30048; G06T 2207/30101; G06T 2207/30104; G06T 2207/10056; G06T 2207/20024; G06T 2207/20104; G06T 2210/41; G06T 2219/2004; G06T 2200/04; A61B 2576/00; A61B 5/0042; A61B 5/4064; A61B 5/4848; A61B 5/7267; G06K 9/00496; G06K 9/6218; G16H 30/40; G16H 50/20; G06N 3/08–088; G06N 5/00; G06N 7/00; G06N 20/00; G09G 2320/0626; G09G 2320/0666; G09G 2380/08; Y10S 128/92; Y10S 128/922; Y10S 128/923; Y10S 122/924

See application file for complete search history.

(56) References Cited

U.S. PATENT DOCUMENTS

| | | | | |
|---|---|---|---|---|
| 10,657,645 B2 * | 5/2020 | Parsey | .................. | G01R 33/481 |
| 10,726,545 B2 * | 7/2020 | Marrouche | .......... | A61B 5/7275 |
| 2003/0097076 A1 * | 5/2003 | Nambu | .................. | A61B 6/481 |
| | | | | 600/504 |
| 2004/0127799 A1 * | 7/2004 | Sorensen | .............. | G06T 7/0012 |
| | | | | 600/481 |
| 2006/0036152 A1 * | 2/2006 | Kozel | .................... | A61B 5/164 |
| | | | | 600/410 |
| 2007/0236491 A1 * | 10/2007 | Hundley | ................ | A61B 6/466 |
| | | | | 345/418 |
| 2011/0150309 A1 * | 6/2011 | Barfett | ...................... | G06T 7/11 |
| | | | | 382/131 |
| 2015/0206300 A1 * | 7/2015 | Nowin | .................. | G06T 7/0014 |
| | | | | 382/131 |
| 2018/0310869 A1 * | 11/2018 | Yablonskiy | ............ | A61B 5/055 |
| 2018/0321347 A1 * | 11/2018 | Wang | ..................... | A61B 5/055 |
| 2021/0150671 A1 * | 5/2021 | Guo | .......................... | G06T 5/50 |

FOREIGN PATENT DOCUMENTS

| | | |
|---|---|---|
| CN | 110490881 A | 11/2019 |
| TW | I654966 B | 4/2019 |

OTHER PUBLICATIONS

Drawings of U.S. Appl. No. 62/890,868, filed Aug. 8, 2019 (Year: 2019).*

Céline R. Gillebert et al., "Automated delineation of stroke lesions using brain CT images," NeuroImage: Clinical, 4, 2014, pp. 540-548.

Chiun-Li Chin et al., "An automated early ischemic stroke detection system using CNN deep learning algorithm," 2017 IEEE 8th International Conference on Awareness Science and Technology (iCAST), 2017, pp. 368-372.

Xiaohong W. Gao et al., "A deep learning based approach to classification of CT brain images," 2016 SAI Computing Conference (SAI), 2016.

J. T. Marbun et al., "Classification of stroke disease using convolutional neural network," 2nd International Conference on Computing and Applied Informatics 2017, Journal of Physics: Conference Series, 978, 012092, 2018.

Oky Dwi Nurhayati et al., "Stroke identification system on the mobile based CT scan image," 2015 2nd International Conference on Information Technology, Computer, and Electrical Engineering (ICITACEE), 2015.

Danillo Roberto Pereira et al., "Stroke Lesion Detection Using Convolutional Neural Networks," 2018 International Joint Conference on Neural Networks (IJCNN), 2018.

* cited by examiner

300

400

500

600

700

800

SYSTEM FOR ANALYZING BRAIN TISSUE COMPONENTS BASED ON COMPUTED TOMOGRAPHY IMAGE AND OPERATION METHOD THEREOF

RELATED APPLICATIONS

This application claims priority to Taiwan Patent Application No. 109104583, filed Feb. 13, 2020, the entirety of which is herein incorporated by reference.

BACKGROUND

Field of Invention

The present invention relates to electronic systems and operation methods, and more particularly, a system for analyzing brain tissue based on computerized tomographic imaging and an operating method thereof.

Description of Related Art

Nowadays, the magnetic resonance imaging (MRI) technology can scan the patient's brain. However, the MRI time is longer (more than 10 minutes), and the cost is higher; during the MRI process, the patient having acute infarct stroke often miss the first aid time. Furthermore, the MRI examinations cannot allow patients with pacemakers, ferromagnetic metal implants, or the like.

The computed tomography (CT) imaging technology takes a short time (e.g., several seconds) to scan the patient's brain. However, in practice, it is not easy to directly identify an infarction volume from the originally computed tomography image.

SUMMARY

In one or more various aspects, the present disclosure is directed to a system for analyzing brain tissue based on computerized tomographic imaging and an operating method thereof.

An embodiment of the present disclosure is related to a system for analyzing brain tissue based on computerized tomographic imaging. The system includes a memory circuit and a processor, the processor is electrically connected to the memory circuit. The memory circuit is configured to store at least one instruction. The processor is configured to access and execute the at least one instruction for: aligning a computed tomography image of a subject to a predetermined standard brain space image, to obtain a first normalized test computed tomography image; enhancing a voxel contrast of the first normalized test computed tomography image, for removing a skull portion and a cerebrospinal fluid portion from the first normalized test computed tomography image, to obtain an enhanced first normalized test computed tomography image; aligning the enhanced first normalized test computed tomography image to an average computed tomographic image of a control group, to obtain a second normalized test computed tomography image; smoothing the second normalized test computed tomography image, to obtain a smoothed second normalized test computed tomography image; performing an analysis based on the smoothed second normalized test computed tomography image and a plurality of computerized tomographic images of the control group, to obtain a t-score map.

In one embodiment of the present disclosure, the processor accesses and executes the at least one instruction for: performing a calculation of an average value and a standard deviation on the computerized tomographic images of the control group, to obtain the average computed tomographic image of the control group.

In one embodiment of the present disclosure, the processor accesses and executes the at least one instruction for: marking at least one infarction volume in the t-score map through a trained neural network.

In one embodiment of the present disclosure, the processor accesses and executes the at least one instruction for: using a data augmentation to divide a first amount of images into a second amount of images for a training of a deep learning of a neural network, to obtain the trained neural network capable of discriminating infarction images from non-infarction images in the second amount of images.

In one embodiment of the present disclosure, the neural network is a convolutional neural network.

Another embodiment of the present disclosure is related to an operation method of a system for analyzing brain tissue based on computerized tomographic imaging, the system includes a processor, and the operation method includes steps of: using the processor for aligning a computed tomography image of a subject to a predetermined standard brain space image, to obtain a first normalized test computed tomography image; using the processor for enhancing a voxel contrast of the first normalized test computed tomography image, for removing a skull portion and a cerebrospinal fluid portion from the first normalized test computed tomography image, to obtain an enhanced first normalized test computed tomography image; using the processor for aligning the enhanced first normalized test computed tomography image to an average computed tomographic image of a control group, to obtain a second normalized test computed tomography image; using the processor for smoothing the second normalized test computed tomography image, to obtain a smoothed second normalized test computed tomography image; and using the processor for performing an analysis based on the smoothed second normalized test computed tomography image and a plurality of computerized tomographic images of the control group, to obtain a t-score map.

In one embodiment of the present disclosure, the operation method further includes a step of using the processor for performing a calculation of an average value and a standard deviation on the computerized tomographic images of the control group, to obtain the average computed tomographic image of the control group.

In one embodiment of the present disclosure, the operation method further includes a step of using the processor for marking at least one infarction volume in the t-score map through a trained neural network.

In one embodiment of the present disclosure, the operation method further includes a step of using a data augmentation to divide a first amount of images into a second amount of images for a training of a deep learning of a neural network, to obtain the trained neural network capable of discriminating infarction images from non-infarction images in the second amount of images.

In one embodiment of the present disclosure, the neural network is a convolutional neural network.

Technical advantages are generally achieved, by embodiments of the present disclosure. The present disclosure provides the system for analyzing brain tissue based on computerized tomographic imaging and the operating method thereof, so as to improve the resolution and reliability of the computed tomography image.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
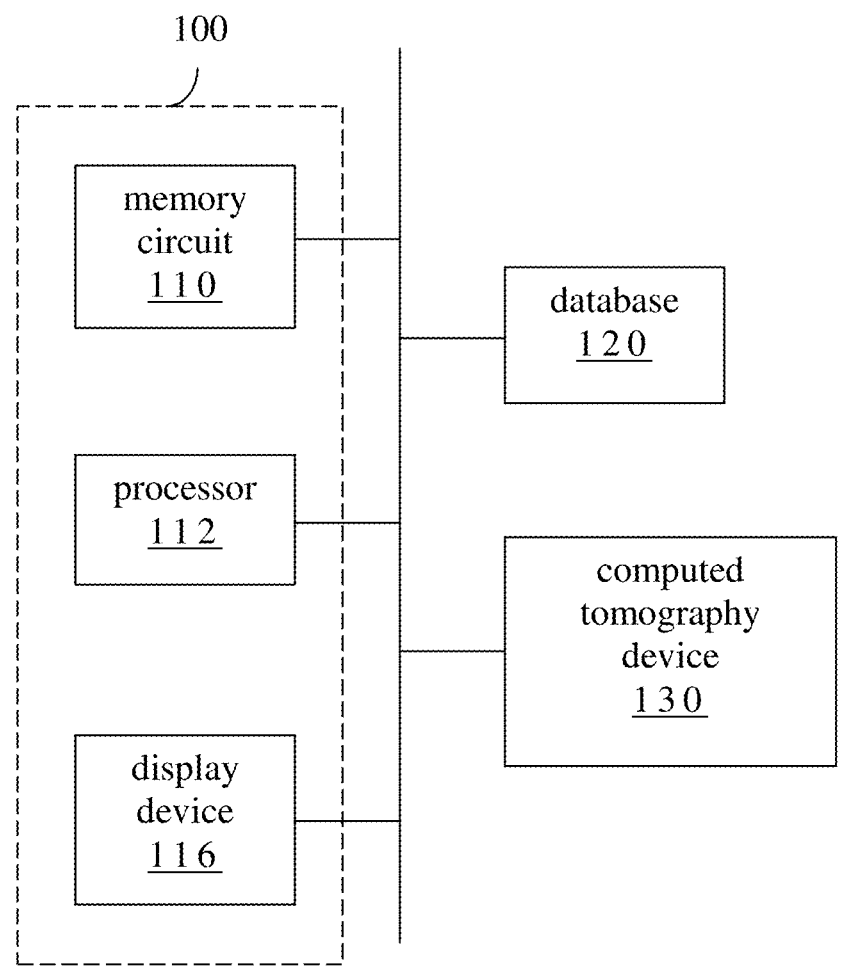
FIG. 1 is a block diagram of a system for analyzing brain tissue based on computerized tomographic imaging according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

As used in the description herein and throughout the claims that follow, the meaning of "a", "an", and "the" includes reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to. As used in the description herein and throughout the claims that follow, the meaning of "in" includes "in" and "on" unless the context clearly dictates otherwise.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a system 100 for analyzing brain tissue based on computerized tomographic imaging according to some embodiments of the present disclosure. As shown in FIG. 1, in some embodiments, the system 100 can include a memory circuit 110 and a processor 112.

In some embodiments, the memory circuit 110 can be a flash memory, a hard disk drive (HDD), a solid-state drive (SSD), a dynamic random access memory (DRAM) and a static random access memory (SRAM). In some embodiments, the memory circuit 110 can store at least one instruction. The instruction relates to an operation method, especially an operation method of a system for analyzing brain tissue based on computerized tomographic imaging.

In some embodiments, the processor 112 can include, but not limited to, a single processor or an integration of multiple microprocessors, such as a central processing unit (CPU), a graphics processing unit (GPU), etc. The processors are electrically coupled to the memory. In this way, the processor 112 can access the instruction from the memory circuit 110 and execute specific applications based on the instruction, in order to perform the operation method of the system for analyzing the brain tissue based on the computerized tomographic imaging. For better understandings of the operation method, details of the operation method are introduced in following paragraphs.

As shown in FIG. 1, in some embodiments, the processor 112 can be communicatively coupled to the database 120 selectively. In some embodiments, the database 120 can store a plurality of computed tomography images, especially computed tomography images of normal brains of multiple control subjects in different age ranges. In some embodiments, the database 120 can be implemented by some external servers out of the system 100. In some embodiments, the database 120 can be implemented by the memory circuit 110.

As shown in FIG. 1, the processor 112 can be communicatively coupled to the computed tomography device 130 selectively. In some embodiments, the computed tomography device 130 can operate for generating the plurality of computed tomography images, especially the computed tomography images of the normal brains of multiple control subjects. In some embodiments, the computed tomography device 130 can store the computed tomography images of the normal brains, or transmit the he computed tomography images of the normal brains to specific storage devices. In some embodiments, the computed tomography device 130 can be replaced with alternative scanning devices of obtaining structures inside a brain.

In FIG. 1, the processor 112 is the display device 116, and the display device 116 can display images as shown in FIGS. 3 to 9, so that the operator can watch these images through the display device 116.

It is noted that the term "electrically connecting" or "communicatively coupling" can refer to physical or non-physical coupling. For example, in some embodiments, the processor 112 can be coupled the database 120 via physical cables. In some other embodiments, the processor 112 can be coupled to the computed tomography device 130 via some wireless communication standards. However, above embodiments are not intended to limit the fashion of unit coupling of the present disclosure. Through aforesaid coupling, the processor 112, the database 120 and the computed tomography device 130 can establish unidirectional or bidirectional information exchanges.

Referring to FIG. 1 and FIGS. 3 to 9, the processor 112 is configured to access and execute the instruction for aligning a computed tomography image 300 of a subject (e.g., a patient with acute infarct stroke) to a predetermined standard brain space image 400, to obtain a first normalized test computed tomography image 500. For example, the predetermined standard brain space image 400 can be reference images provided by the supplier of the computed tomography device 130.

The processor 112 is configured to access and execute the instruction for enhancing a voxel contrast of the first normalized test computed tomography image 500, for removing a skull portion and a cerebrospinal fluid portion from the first normalized test computed tomography image 500, to obtain an enhanced first normalized test computed tomography image 600. For example, in the first normalized test computed tomography image 500, unit values of −1000 to −100 are shifted to 0 to 900, and then the unit value 1000 is added to each of the shifted unit values; unit values of −99 to 100 are linearly scaled to unit value of 911 to 3100; the unit value 3000 is added to each of unit values that are greater than 100.

The processor 112 is configured to access and execute the instruction for aligning the enhanced first normalized test computed tomography image 600 to an average computed tomographic image of a control group, to obtain a second normalized test computed tomography image 700. In some other embodiments, the processor 112 is configured to access and execute the instruction for performing a calculation of an average value and a standard deviation on the computerized tomographic images of the control group, to obtain the average computed tomographic image of the control group. In practice, above first normalization and above process of enhancing the voxel contrast are applied to the computerized tomographic images of the control group.

The processor 112 is configured to access and execute the instruction for smoothing the second normalized test computed tomography image 700, to obtain a smoothed second normalized test computed tomography image 800, thereby improving the signal-to-noise ratio of the image.

The processor 112 is configured to access and execute the instruction for performing an analysis based on the smoothed second normalized test computed tomography image 800 and a plurality of computerized tomographic images of the control group, to obtain a t-score map 900.

The t-score satisfies the following relationship:

$$t = \frac{\chi - \frac{1}{n}\sum_{1}^{n} C_i}{\sqrt{\frac{n+1}{n(n-1)}\sum_{i=1}^{n}\left(C_i - \frac{1}{n}\sum_{i=1}^{n} C_i\right)^2}}$$

In the relationship, n is the number of the computerized tomographic images of the control group, $\chi$ is the intensity value of each voxel in the smoothed second normalized test computed tomography image 800, and $C_i$ is the intensity value of each voxel in the computed tomography image of each control group.

In some other embodiments, the processor 112 is configured to access and execute the instruction for marking at least one infarction volume 910 in the t-score map 900 through a trained neural network.

In some other embodiments, the processor 112 is configured to access and execute the instruction for using a data augmentation to divide a first amount of images into a second amount of images for a training of a deep learning of a neural network (e.g., a convolutional neural network), to obtain the trained neural network capable of discriminating infarction images from non-infarction images in the second amount of images. In practice, the data augmentation can segment the stereoscopic image and/or can perform the eight-directional translation segmentation position and then re-segment the stereoscopic image, so that the second amount of images is much more than the first amount of images, so as to improve the efficient of machine learning.

Figure 2:
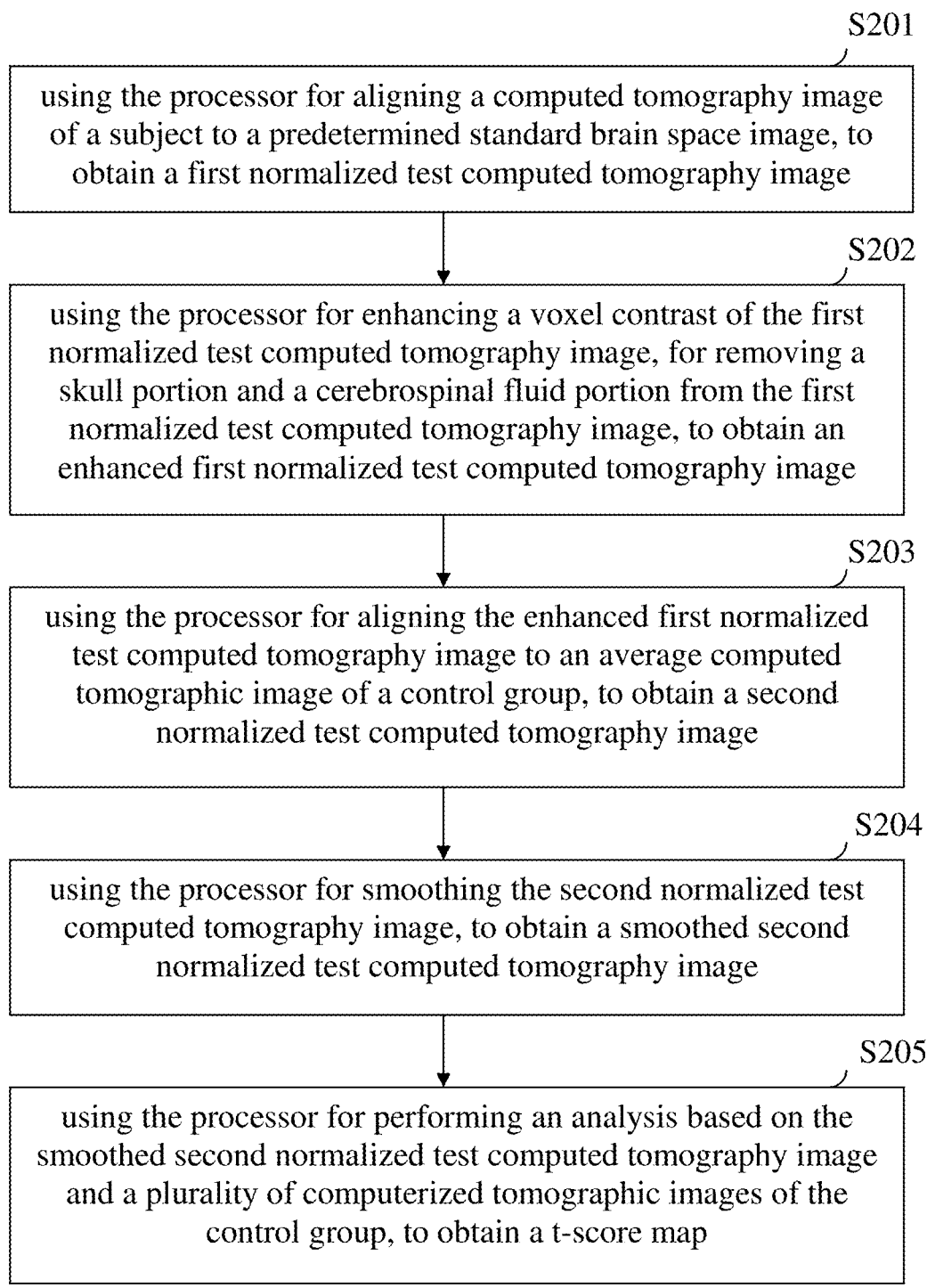
FIG. 2 is a flow chart of an operation method of the system for analyzing the brain tissue based on the computerized tomographic imaging according to some embodiments of the present disclosure.
Figure 3:
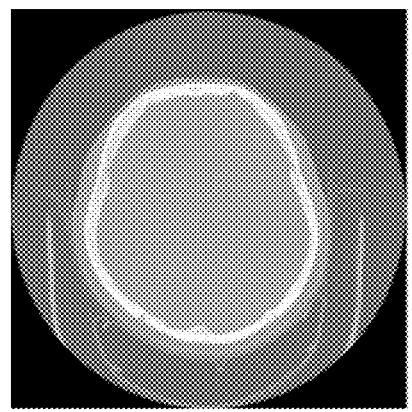
FIGS. 3-9 are schematic diagrams of images processed through the system for analyzing the brain tissue based on the computerized tomographic imaging according to some embodiments of the present disclosure.
Figure 4:
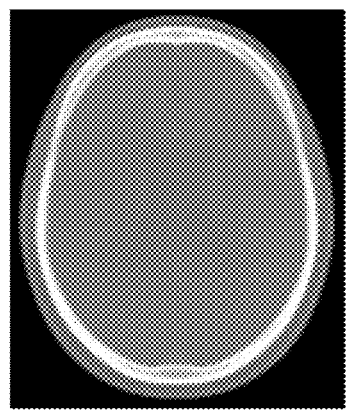
Figure 5:
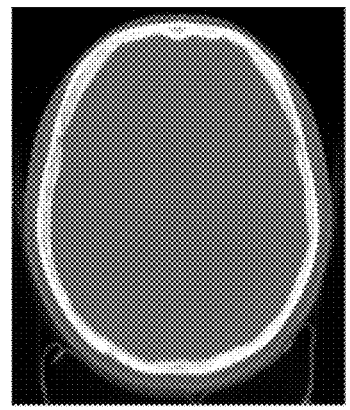
Figure 6:
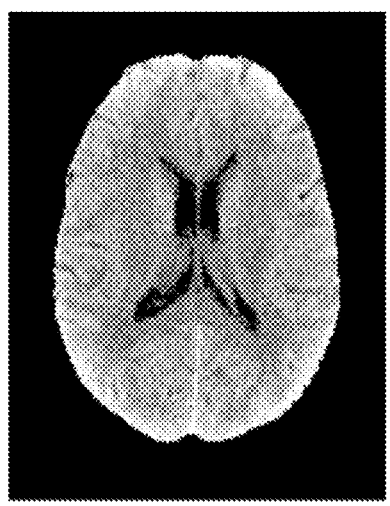
Figure 7:
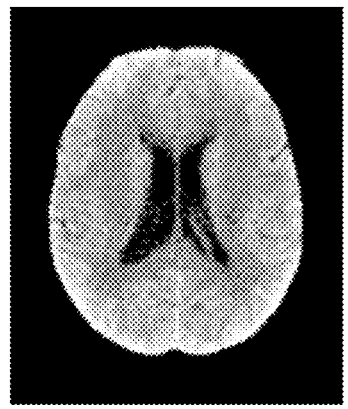
Figure 8:
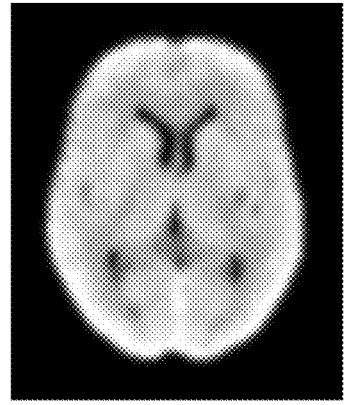
Figure 9:
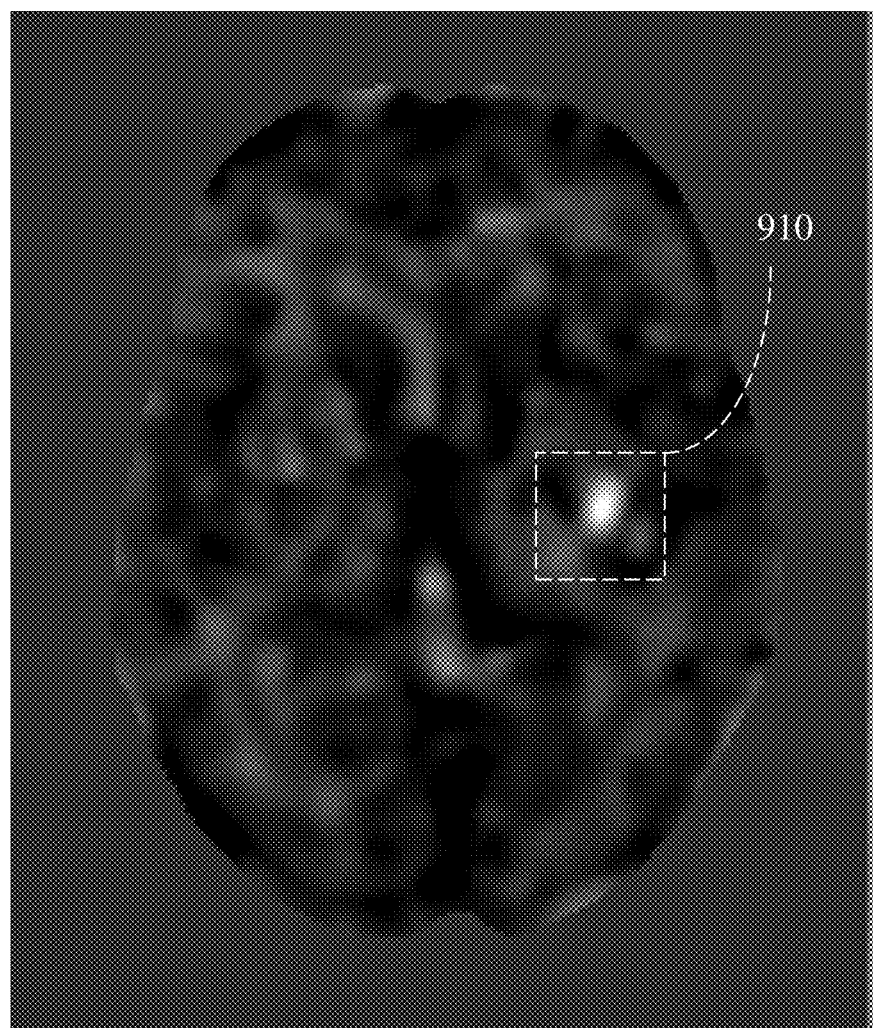

For a more complete understanding of an operating method of the system 100, referring FIGS. 1-9, FIG. 2 is a flow chart of the operation method 200 of the system 100 for analyzing brain tissue based on computerized tomographic imaging according to one embodiment of the present disclosure. As shown in FIG. 2, the operation method 200 includes operations S201-S205. However, as could be appreciated by persons having ordinary skill in the art, for the steps described in the present embodiment, the sequence in which these steps is performed, unless explicitly stated otherwise, can be altered depending on actual needs; in certain cases, all or some of these steps can be performed concurrently.

In operation S201, the processor 112 is used for aligning a computed tomography image 300 of a subject (e.g., a patient with acute infarct stroke) to a predetermined standard brain space image 400, to obtain a first normalized test computed tomography image 500. For example, the predetermined standard brain space image 400 can be reference images provided by the supplier of the computed tomography device 130.

In operation S202, the processor 112 is used for enhancing a voxel contrast of the first normalized test computed tomography image 500, for removing a skull portion and a cerebrospinal fluid portion from the first normalized test computed tomography image 500, to obtain an enhanced first normalized test computed tomography image 600. For example, in the first normalized test computed tomography image 500, unit values of −1000 to −100 are shifted to 0 to 900, and then the unit value 1000 is added to each of the shifted unit values; unit values of −99 to 100 are linearly scaled to unit value of 911 to 3100; the unit value 3000 is added to each of unit values that are greater than 100.

In operation S203, the processor 112 is used for aligning the enhanced first normalized test computed tomography image 600 to an average computed tomographic image of a control group, to obtain a second normalized test computed tomography image 700. In some other embodiments, the processor 112 is used for performing a calculation of an average value and a standard deviation on the computerized tomographic images of the control group, to obtain the average computed tomographic image of the control group. In practice, above first normalization and above process of enhancing the voxel contrast are applied to the computerized tomographic images of the control group.

In operation S204, the processor 112 is used for smoothing the second normalized test computed tomography image 700, to obtain a smoothed second normalized test computed tomography image 800, thereby improving the signal-to-noise ratio of the image.

In operation S205, the processor 112 is used for performing an analysis based on the smoothed second normalized test computed tomography image 800 and a plurality of computerized tomographic images of the control group, to obtain a t-score map 900.

In the operation method 200, the processor 112 is used for marking at least one infarction volume 910 in the t-score map 900 through a trained neural network.

In the operation method 200, the processor 112 is used for using a data augmentation to divide a first amount of images into a second amount of images for a training of a deep learning of a neural network (e.g., a convolutional neural network), to obtain the trained neural network capable of discriminating infarction images from non-infarction images in the second amount of images. In practice, the data augmentation can segment the stereoscopic image and/or can perform the eight-directional translation segmentation position and then re-segment the stereoscopic image, so that the second amount of images is much more than the first amount of images, so as to improve the efficient of machine learning.

In view of above, technical advantages are generally achieved, by embodiments of the present disclosure. The present disclosure provides the system 100 for analyzing brain tissue based on computerized tomographic imaging and the operating method 200 thereof, so as to improve the resolution and reliability of the computed tomography image.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A system for analyzing brain tissue based on computerized tomographic imaging, and the system comprising:
   a memory circuit configured to store at least one instruction; and
   a processor electrically connected to the memory circuit, and the processor configured to access and execute the at least one instruction for:
   aligning a computed tomography image of a subject to a predetermined standard brain space image, to obtain a first normalized test computed tomography image;
   enhancing a voxel contrast of the first normalized test computed tomography image, for removing a skull portion and a cerebrospinal fluid portion from the first normalized test computed tomography image, to obtain an enhanced first normalized test computed tomography image;
   aligning the enhanced first normalized test computed tomography image to an average computed tomographic image of a control group, to obtain a second normalized test computed tomography image;
   smoothing the second normalized test computed tomography image, to obtain a smoothed second normalized test computed tomography image;
   performing an analysis based on the smoothed second normalized test computed tomography image and a plurality of computerized tomographic images of the control group, to obtain a t-score map; and
   marking at least one infarction volume in the t-score map through a trained neural network.

2. The system of claim 1, wherein the processor accesses and executes the at least one instruction for:
   performing a calculation of an average value and a standard deviation on the computerized tomographic images of the control group, to obtain the average computed tomographic image of the control group.

3. The system of claim 1, wherein the processor accesses and executes the at least one instruction for:
   using a data augmentation to divide a first amount of images into a second amount of images for a training of a deep learning of a neural network, to obtain the trained neural network capable of discriminating infarction images from non-infarction images in the second amount of images.

4. The system of claim 3, wherein the neural network is a convolutional neural network.

5. An operation method of a system for analyzing brain tissue based on computerized tomographic imaging, the system comprising a processor, and the operation method comprising:
   using the processor for aligning a computed tomography image of a subject to a predetermined standard brain space image, to obtain a first normalized test computed tomography image;
   using the processor for enhancing a voxel contrast of the first normalized test computed tomography image, for removing a skull portion and a cerebrospinal fluid portion from the first normalized test computed tomography image, to obtain an enhanced first normalized test computed tomography image;
   using the processor for aligning the enhanced first normalized test computed tomography image to an average computed tomographic image of a control group, to obtain a second normalized test computed tomography image;
   using the processor for smoothing the second normalized test computed tomography image, to obtain a smoothed second normalized test computed tomography image;
   using the processor for performing an analysis based on the smoothed second normalized test computed tomography image and a plurality of computerized tomographic images of the control group, to obtain a t-score map; and
   using the processor for marking at least one infarction volume in the t-score map through a trained neural network.

6. The operation method of claim 5, further comprising:
   using the processor for performing a calculation of an average value and a standard deviation on the computerized tomographic images of the control group, to obtain the average computed tomographic image of the control group.

7. The operation method of claim 5, further comprising:
   using a data augmentation to divide a first amount of images into a second amount of images for a training of a deep learning of a neural network, to obtain the trained neural network capable of discriminating infarction images from non-infarction images in the second amount of images.

8. The operation method of claim 7, wherein the neural network is a convolutional neural network.

* * * * *